US012658445B2

(12) United States Patent
Lee et al.

(10) Patent No.: US 12,658,445 B2
(45) Date of Patent: Jun. 16, 2026

(54) BINDER FOR SECONDARY BATTERY, NEGATIVE ELECTRODE FOR SECONDARY BATTERY INCLUDING THE SAME, AND LITHIUM SECONDARY BATTERY INCLUDING THE SAME

(71) Applicant: SK On Co., Ltd., Seoul (KR)

(72) Inventors: Dong Gun Lee, Daejeon (KR); Gwi Ok Park, Daejeon (KR); Seok Keun Yoo, Daejeon (KR); Min Kyung Seon, Daejeon (KR); Jun Soo Son, Daejeon (KR); Ju Ho Chung, Daejeon (KR)

(73) Assignee: SK On Co., Ltd., Seoul (KR)

( * ) Notice: Subject to any disclaimer, the term of this patent is extended or adjusted under 35 U.S.C. 154(b) by 657 days.

(21) Appl. No.: 18/078,214

(22) Filed: Dec. 9, 2022

(65) Prior Publication Data

US 2023/0187641 A1 Jun. 15, 2023

(30) Foreign Application Priority Data

Dec. 10, 2021 (KR) ........................ 10-2021-0177013

(51) Int. Cl.
*H01M 4/62* (2006.01)
*C08F 216/06* (2006.01)
*C08F 220/06* (2006.01)
*C08K 5/17* (2006.01)

(52) U.S. Cl.
CPC ........... *H01M 4/622* (2013.01); *C08F 216/06* (2013.01); *C08F 220/06* (2013.01); *C08K 5/17* (2013.01)

(58) Field of Classification Search
None
See application file for complete search history.

(56) References Cited

U.S. PATENT DOCUMENTS

| | | | | |
|---|---|---|---|---|
| 4,102,842 | A | 7/1978 | Fujimoto et al. | |
| 4,452,949 | A | 6/1984 | Penning et al. | |
| 5,525,444 | A | 6/1996 | Ito et al. | |
| 2009/0208748 | A1* | 8/2009 | Torii | A61L 15/60 526/317.1 |
| 2020/0152986 | A1 | 5/2020 | Lee et al. | |
| 2020/0299495 | A1 | 9/2020 | Hashimoto et al. | |
| 2021/0050595 | A1 | 2/2021 | Kim et al. | |

FOREIGN PATENT DOCUMENTS

| | | | |
|---|---|---|---|
| JP | 202115778 | A | 2/2021 |
| KR | 100324641 | B1 | 7/2002 |
| KR | 1020090019630 | A | 2/2009 |
| KR | 101617668 | B1 | 5/2016 |
| KR | 1020200056136 | A | 5/2020 |
| KR | 1020200062082 | A | 6/2020 |
| KR | 1020210020759 | A | 2/2021 |

OTHER PUBLICATIONS

"Useful Polymers formed by Radical Chain Reactions" accesssed Jul. 6, 2025, LibreTexts, https://chem.libretexts.org/Bookshelves/Organic_Chemistry/Book%3A_Organic_Chemistry_with_a_Biological_Emphasis_v2.0_(Soderberg)/16%3A_Radical_Reactions/16.04%3A_Useful_Polymers_formed_by_Radical_Chain_Reactions (Year: 2025).*

* cited by examiner

*Primary Examiner* — Ryan S Cannon
*Assistant Examiner* — Karen J. Armstrong
(74) *Attorney, Agent, or Firm* — The Webb Law Firm

(57) ABSTRACT

Provided are a novel binder for a secondary battery including a copolymer containing specific repeating units, and a binder composition for a secondary battery including the binder for a secondary battery and a compound containing an amine group and a hydroxyl group. When the binder for a secondary battery or the binder composition for a secondary battery is applied to a negative electrode and a secondary battery, expansion of the negative electrode is effectively suppressed, and the charge/discharge cycle characteristics and the performance of the secondary battery are significantly improved. Furthermore, the binder for a secondary battery has improved coatability and adhesion to effectively suppress the exfoliation and desorption of the negative electrode, thereby improving the performance of the secondary battery.

8 Claims, No Drawings

BINDER FOR SECONDARY BATTERY, NEGATIVE ELECTRODE FOR SECONDARY BATTERY INCLUDING THE SAME, AND LITHIUM SECONDARY BATTERY INCLUDING THE SAME

CROSS-REFERENCE TO RELATED APPLICATION

This application claims priority to Korean Patent Application No. 10-2021-0177013, filed Dec. 10, 2021, the disclosure of which is hereby incorporated by reference in its entirety.

BACKGROUND OF THE INVENTION

Field of the Invention

The following disclosure relates to a binder for a secondary battery, a negative electrode including the same, and a secondary battery including the same.

More particularly, the following disclosure relates to a novel binder including a copolymer comprising a specific repeating unit, a negative electrode for a secondary battery having excellent mechanical properties and an improved binding force, prepared using the binder, and a secondary battery including the same.

Description of Related Art

As a secondary battery application range is expanded to electric vehicles and power storage, a demand for developing an electrode having high stability, long cycle life, high energy density, and high output properties is growing.

A lithium secondary battery may be a battery including a positive electrode including a positive electrode active material capable of inserting/desorbing lithium ions, a negative electrode including a negative electrode active material, a microporous separator between the positive electrode and the negative electrode, and a nonaqueous electrolyte.

Among them, as a negative electrode active material, a silicon-based active material is increasingly used due to a significantly increased charge and discharge capacity, but the volume expands by a lithium ion during charging and discharging, thereby greatly affecting the stability of the battery. For example, when a silicon-based material is used as the negative electrode active material, the volume may be increased up to 300% in some cases, and thus, there is a limitation to using it, which causes charge and discharge characteristics to be significantly lowered.

In order to solve the problem, a technology of a binder for a negative electrode active material is being developed. For example, in order to suppress a change in volume due to the charge and discharge of, in particular, a silicon-based negative electrode active material as described above, a technology of forming a negative electrode active material layer using a binder such as carboxymethyl cellulose (CMC) and styrene butadiene rubber (SBR) as the binder of the negative electrode active material has been developed. However, the binder for a negative electrode active material may partly solve the problem of excessive volume expansion, but there is still a need to suppress volume expansion, and also, there is still a problem in that due to its low adhesion, an active material is desorbed as charge and discharge progress, thereby deteriorating battery characteristics.

Therefore, there is a need to develop a novel binder for a negative electrode active material, which suppresses a change in volume of an electrode occurring as charge and discharge progress, retains sufficient adhesive strength to prevent deterioration of battery performance due to release or desorption of a negative electrode, and is not deteriorated.

In addition, a novel binder for a secondary battery, which may promote battery cycle life and performance improvement by developing a binder having the characteristics, is demanded.

SUMMARY OF THE INVENTION

An embodiment of the present invention is directed to providing a binder for a secondary battery having excellent mechanical properties and improved adhesion.

Another embodiment of the present invention is directed to providing a binder composition for a secondary battery having excellent mechanical properties and more improved adhesion.

Another embodiment of the present invention is directed to providing a negative electrode slurry composition for a secondary battery having improved coatability and adhesion and a negative electrode including the same, by using the binder or the binder composition.

Still another embodiment of the present invention is directed to providing a negative electrode having significantly improved charge/discharge cycle characteristics and battery performance and a secondary battery including the same, by effectively suppressing desorption of a negative electrode and expansion of a negative electrode.

In one general aspect, a binder for a secondary battery is provided, the binder comprising: a copolymer comprising a repeating unit (a) of the following Chemical Formula 1, a repeating unit (b) of the following Chemical Formula 2, a repeating unit (c) of the following Chemical Formula 3, a repeating unit (d) of the following Chemical Formula 4, and a repeating unit (e) of the following Chemical Formula 5:

[Chemical Formula 1]

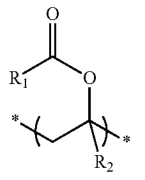

[Chemical Formula 2]

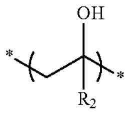

[Chemical Formula 3]

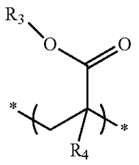

[Chemical Formula 4]

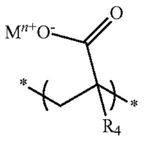

-continued

[Chemical Formula 5]

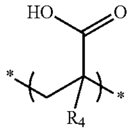

wherein $R_1$ and $R_3$ are independently of each other substituted or unsubstituted hydrocarbyl having 1 to 10 carbon atoms;

$R_2$ and $R_4$ are independently of each other hydrogen or substituted or unsubstituted hydrocarbyl having 1 to 10 carbon atoms;

$M^{n+}$ is a cation having an oxidation number of n other than a hydrogen ion; and n is an integer of 1 to 3.

In the binder for a secondary battery according to an exemplary embodiment, (a+b):(c+d+e) of the copolymer may be 0.05 to 0.95:0.95 to 0.05, wherein a, b, c, d, and e are mole fractions of the repeating units (a), (b), (c), (d), and (e), respectively, in the copolymer.

In the binder for a secondary battery according to an exemplary embodiment, the copolymer may satisfy the following Equation 1:

$$0.45<(b+d+e)/(a+b+c+d+e)<1.0 \quad \text{[Equation 1]}$$

wherein a, b, c, d, and e are mole fractions of the repeating units (a), (b), (c), (d), and (e), respectively, in the copolymer.

In the binder for a secondary battery according to an exemplary embodiment, the copolymer may satisfy the following Equation 2:

$$0.01<e/(d+e)<0.9 \quad \text{[Equation 2]}$$

wherein d and e are mole fractions of the repeating units (d) and (e), respectively, in the copolymer.

In the binder for a secondary battery according to an exemplary embodiment, e of the copolymer may be 0.001 or more, wherein e is a mole fraction of the repeating unit (e) in the copolymer.

In the binder for a secondary battery according to an exemplary embodiment, the copolymer may have a weight average molecular weight of 200,000 to 2,000,000 Da.

In the binder for a secondary battery according to an exemplary embodiment, the copolymer may be a linear polymer.

In the binder for a secondary battery according to an exemplary embodiment, the binder for a secondary battery may be a binder for a lithium secondary battery negative electrode.

In another general aspect, a binder composition for a secondary battery is provided, the binder composition comprising: a copolymer and a compound comprising an amine group and a hydroxyl group, wherein the copolymer comprising a repeating unit (a) of the following Chemical Formula 1, a repeating unit (b) of the following Chemical Formula 2, a repeating unit (c) of the following Chemical Formula 3, a repeating unit (d) of the following Chemical Formula 4, and a repeating unit (e) of the following Chemical Formula 5:

[Chemical Formula 1]

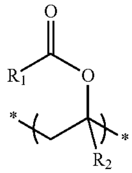

[Chemical Formula 2]

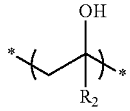

[Chemical Formula 3]

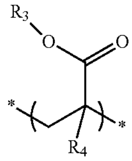

[Chemical Formula 4]

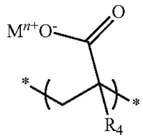

[Chemical Formula 5]

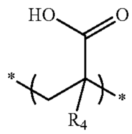

wherein $R_1$ and $R_3$ are independently of each other substituted or unsubstituted hydrocarbyl having 1 to 10 carbon atoms;

$R_2$ and $R_4$ are independently of each other hydrogen or substituted or unsubstituted hydrocarbyl having 1 to 10 carbon atoms;

$M^{n+}$ is a cation having an oxidation number of n other than a hydrogen ion; and n is an integer of 1 to 3.

In the binder composition for a secondary battery according to an exemplary embodiment, the compound comprising an amine group and a hydroxyl group may be a compound comprising one or more primary, secondary, or tertiary amine groups and one or more hydroxyl groups.

In the binder composition for a secondary battery according to an exemplary embodiment, the compound comprising an amine group and a hydroxyl group may be one or a combination of two or more selected from the group consisting of monoethanol amine, diethanol amine, triethanolamine, N-methylethanolamine, 2-ethylaminoethanol, aminoethylethanolamine, 2-diethylaminoethanol, (2-aminoethoxy)-1-ethanol, 2-aminopropanol, 3-aminopropanol, 1,2-diaminopropanol, 1,3-diamino-2-propanol, 2-amino-2-methyl propanol, 2-amino-2-methyl butanol, 2-amino-2-ethyl-1,3-propanediol, 4-aminobutanol, 5-aminopentanol, tris(hydroxymethyl)aminomethane, and the like.

In the binder composition for a secondary battery according to an exemplary embodiment, a mole ratio between the compound comprising an amine group and a hydroxyl group and the repeating unit (e) of Chemical Formula 5 included in the binder composition for a secondary battery may satisfy 0.01 to 1:1.

In another general aspect, a secondary battery comprises: a positive electrode and a negative electrode for a secondary battery, wherein the negative electrode for a secondary battery comprises a current collector; and a negative electrode active material layer disposed on the current collector, and the negative electrode active material layer comprises any of the binder(s) for a secondary battery described above or any of the binder composition(s) for a secondary battery described above; and a negative electrode active material.

In the secondary battery according to an exemplary embodiment, the negative electrode active material may comprise a silicon-based active material.

In the secondary battery according to an exemplary embodiment, the negative electrode active material may further comprise a graphite-based active material.

In the secondary battery according to an exemplary embodiment, a mass ratio between the silicon-based active material and the graphite-based active material may be 3 to 97:97 to 3.

In the secondary battery according to an exemplary embodiment, the binder for a secondary battery or the binder composition for a secondary battery may be included at 0.5 to 30 wt % with respect to a weight of the negative electrode active material layer.

In still another general aspect, a method of preparing a binder for a secondary battery comprises:

(A) saponifying a copolymer comprising a repeating unit (a) of the following Chemical Formula 1 and a repeating unit (c) of the following Chemical Formula 3 to prepare a saponified copolymer; and (B) acidifying the saponified copolymer to prepare an acidified copolymer, wherein the acidified copolymer is a copolymer comprising the repeating unit (a) of Chemical Formula 1, a repeating unit (b) of Chemical Formula 2, the repeating unit (c) of Chemical Formula 3, a repeating unit (d) of Chemical Formula 4, and a repeating unit (e) of Chemical Formula 5:

[Chemical Formula 1]

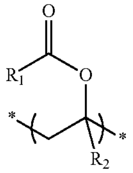

[Chemical Formula 2]

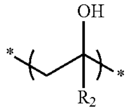

[Chemical Formula 3]

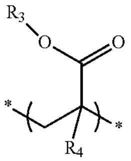

[Chemical Formula 4]

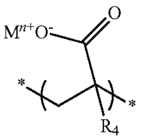

-continued

[Chemical Formula 5]

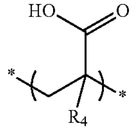

wherein $R_1$ and $R_3$ are independently of each other substituted or unsubstituted hydrocarbyl having 1 to 10 carbon atoms;

$R_2$ and $R_4$ are independently of each other hydrogen or substituted or unsubstituted hydrocarbyl having 1 to 10 carbon atoms;

$M^{n+}$ is a cation having an oxidation number of n other than a hydrogen ion; and n is an integer of 1 to 3.

In the method of preparing a binder for a secondary battery according to an exemplary embodiment, a degree of saponification may be more than 0.45 and less than 1.0, and the degree of saponification may be calculated by (b+d+e)/(a+b+c+d+e), wherein a, b, c, d, and e are mole fractions of the repeating units (a), (b), (c), (d), and (e), respectively, in the acidified copolymer.

In the method of preparing a binder for a secondary battery according to an exemplary embodiment, a degree of acidification in (B) may be more than 0.1 and less than 0.9, and the degree of acidification may be calculated by e/(d+e), wherein d and e are mole fractions of the repeating units (d) and (e), respectively, in the acidified copolymer.

In the method of preparing a binder for a secondary battery according to an exemplary embodiment, after the process of (B), a step (C) of adding the acidified copolymer and a compound comprising an amine group and a hydroxyl group may be further comprised.

Other features and aspects will be apparent from the following detailed description, the drawings, and the claims.

DESCRIPTION OF THE INVENTION

Hereinafter, the present disclosure will be described in more detail. However, the following examples or exemplary embodiments are only a reference for describing the present disclosure in detail, and the present disclosure is not limited thereto and may be implemented in various forms.

In addition, unless otherwise defined, all technical terms and scientific terms have the same meanings as those commonly understood by one of those skilled in the art to which the present disclosure pertains.

The terms used for description in the present specification are only for effectively describing a certain specific exemplary embodiment, and are not intended to limit the present disclosure.

In addition, the singular form, such as "a", "an", and "the", used in the specification and claims appended thereto may be intended to also include a plural form, unless otherwise indicated in the context.

In addition, units used in the present specification without particular mention are based on weights, and as an example, a unit of % or ratio refers to a wt % or a weight ratio and wt % refers to wt % of any one component in a total composition, unless otherwise defined.

In addition, unless explicitly described to the contrary, a part "comprising" or "containing" or "including" a constituent element will be understood to imply further inclusion of other constituent elements rather than the exclusion of any other constituent elements.

For the purposes of this specification, unless otherwise indicated, all numbers expressing quantities of ingredients, reaction conditions, dimensions, physical characteristics, and so forth used in the specification and claims are to be understood as being modified in all instances by the term "about" Unless indicated to the contrary, the numerical parameters set forth in the following specification and attached claims are approximations that can vary depending upon the desired properties sought to be obtained by the present invention.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

In addition, the numerical range used in the present specification may include all values within the range including the lower limit and the upper limit, increments logically derived in a form and span in a defined range, all double limited values, and all possible combinations of the upper limit and the lower limit in the numerical range defined in different forms. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1. Unless otherwise particularly defined in the present specification, values which may be outside a numerical range due to experimental error or rounding off are also included in the defined numerical range.

A "hydrocarbon" described in the present specification refers to a chemical group containing only hydrogen and carbon atoms.

"Hydrocarbyl" or "heterohydrocarbyl" described in the present specification refers to a radical having one bonding position derived from a hydrocarbon or heterohydrocarbon, and "hetero-" means that carbon is substituted by one or more heteroatoms selected from B, O, N, C(=O), P, P(=O), $S_r$, $S(=O)_2$, and a Si atom.

"Hydrocarbylene" described in the present specification refers to a radical having two bonding positions derived from a hydrocarbon.

Hereinafter, the present disclosure will be described in more detail.

The present disclosure relates to a binder for a secondary battery including a copolymer for binder for a secondary battery comprising specific repeating units, and furthermore, to a binder composition for a secondary battery comprising a binder for a secondary battery and a compound comprising an amine group and a hydroxyl group. A negative electrode manufactured by mixing the binder or the binder composition with a negative electrode active material and a secondary battery comprising the negative electrode have excellent mechanical properties and an improved binding force, thereby effectively suppressing exfoliation and desorption of the negative electrode and expansion of the negative electrode even when a silicon-based negative electrode active material is used, and providing a negative electrode for a secondary battery having improved charge/discharge cycle characteristics and battery performance, and a secondary battery including the same.

The present disclosure provides a binder for a secondary battery, the binder comprising: a copolymer comprising a repeating unit (a) of Chemical Formula 1, a repeating unit (b) of Chemical Formula 2, a repeating unit (c) of Chemical Formula 3, a repeating unit (d) of Chemical Formula 4, and a repeating unit (e) of Chemical Formula 5. The binder for a secondary battery shows excellent mechanical properties and an improved binding force, thereby effectively suppressing exfoliation and desorption of the negative electrode and expansion of the negative electrode, even when a silicon-based negative electrode active material is used. Furthermore, a negative electrode for a secondary battery having improved charge/discharge cycle characteristics and battery performance, and a secondary battery including the same may be manufactured, using the binder for a secondary battery:

[Chemical Formula 1]

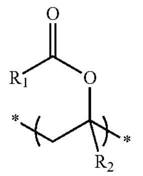

[Chemical Formula 2]

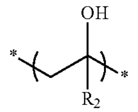

[Chemical Formula 3]

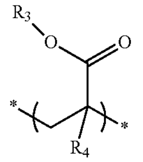

[Chemical Formula 4]

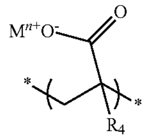

[Chemical Formula 5]

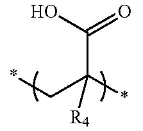

wherein $R_1$ and $R_3$ are independently of each other substituted or unsubstituted hydrocarbyl having 1 to 10 carbon atoms; $R_2$ and $R_4$ are independently of each other hydrogen, substituted or unsubstituted hydrocarbyl having 1 to 10 carbons; $M^{n+}$ is a cation having an oxidation number of n other than a hydrogen ion; and n is an integer of 1 to 3. In some non-limiting examples, $R_1$ and $R_3$ may be independently of each other alkyl having 1 to 5 carbon atoms, for example methyl, ethyl, or propyl. In some non-limiting examples $R_2$ and $R_4$ may be independently of each other hydrogen or alkyl having 1 to 5 carbon atoms, for example hydrogen or methyl.

An exemplary embodiment of the repeating unit (a) of Chemical Formula 1 may be a vinyl acetate-derived unit, an exemplary embodiment of the repeating unit (b) of Chemical Formula 2 may be a vinyl alcohol-derived unit, an exemplary embodiment of the repeating unit (c) of Chemical Formula 3 may be a (meth)acrylate-derived unit, an exemplary embodiment of the repeating unit (d) of Chemical Formula 4 may be an ionized (meth)acrylic acid-derived unit, and an exemplary embodiment of the repeating unit (e) of Chemical Formula 5 may be a non-ionized (meth)acrylic acid-derived unit.

Non-limiting examples of (meth)acrylate(s) useful for preparing the (meth)acrylate-derived unit of Chemical Formula 3 may include acrylate(s) and/or methacrylate(s), and more specifically, may be one or a combination of two or more selected from the group consisting of methyl acrylate, ethyl acrylate, methyl methacrylate, ethyl methacrylate, and the like. Non-limiting examples of (meth)acrylic acid(s) useful for preparing the ionized (meth)acrylic acid-derived unit of Chemical Formula 4 and the non-ionized (meth) acrylic acid-derived unit of Chemical Formula 5 may include acrylic acid and/or methacrylic acid.

Non-limiting examples of a cation of a salt of the ionized (meth)acrylic acid salt may be an alkali metal ion when n is 1, for example at least one or more selected from a sodium ion, a potassium ion, a lithium ion, or the like, or an ammonium ion ($NH_4^+$). In some non-limiting examples, when n is 2, the cation of a salt of the ionized (meth)acrylic acid may be an alkaline earth metal ion, for example a calcium ion or a magnesium ion. In some non-limiting examples, when n is 3, the cation of a salt of the ionized (meth)acrylic acid may be an ion of a metal such as Al or Ga, but is not limited thereto as long as it is commonly used or a known metal ion.

The copolymer may be prepared by various known methods such as emulsion polymerization, suspension polymerization, solution polymerization, and bulk polymerization.

In addition, the copolymer may include known repeating units other than the repeating units (a) to (d), such as, for example, one or more of (meth)acrylamide monomer-derived unit, acrylonitrile monomer-derived unit, aromatic vinyl monomer-derived unit or the like, but is not limited thereto.

In the binder for a secondary battery according to an exemplary embodiment, the binder for a secondary battery comprising the copolymer comprising repeating units (a) to (e) may improve a binding force between a negative electrode current collector and a negative electrode active material layer and/or a binding force of a negative electrode active material layer to suppress the exfoliation and the desorption of a negative electrode and improve the strength and the flexibility of the negative electrode active material layer. In addition, even when a silicon-based negative electrode active material is used, expansion may be effectively suppressed to stabilize battery performance.

The binder for a secondary battery according to an exemplary embodiment may be a binder for a lithium secondary battery negative electrode or a binder for a lithium secondary battery positive electrode, and specifically, may be a binder for a lithium secondary battery negative electrode.

In the binder for a secondary battery according to an exemplary embodiment, the copolymer may be a random copolymer, a block copolymer, or a tapered copolymer in which the repeating units (a) to (e) form a backbone, and the kind thereof is not limited. Specifically, it may be a random copolymer, and a random copolymer comprising the repeating units (a) to (e) has excellent solubility in water, thereby having improved processability and workability in the preparation of a negative electrode slurry composition for a secondary battery, and has excellent tensile strength and flexibility to improve the strength and the flexibility of the negative electrode active material layer.

In the binder for a secondary battery according to an exemplary embodiment, the copolymer may be a linear polymer or a branched polymer, and specifically, may be a linear polymer. When the copolymer is a linear polymer, the copolymer has a larger radius of gyration in a solvent, and thus, may be effectively bound to the negative electrode active material, thereby more effectively suppressing the desorption of the negative electrode from the negative electrode. Furthermore, when the binder composition for a secondary battery is prepared using the linear copolymer having a large radius of gyration, a more robust three-dimensional structure may be formed by an effective ionic bond and/or hydrogen bond. Accordingly, during charging and discharging of a secondary battery, the expansion of the negative electrode may be effectively suppressed to further improve the charge/discharge cycle characteristics of the secondary battery and battery performance.

In the binder for a secondary battery according to an exemplary embodiment, the copolymer may have a weight average molecular weight of 200,000 to 2,000,000 Da, or 400,000 to 1,800,000 Da, or 500,000 to 1,500,000 Da. When the weight average molecular weight range is satisfied, the mechanical properties and the adhesive properties of the binder for a secondary battery may be improved, and the exfoliation and the desorption of the negative electrode and the expansion of the negative electrode may be more effectively suppressed, thereby manufacturing a secondary battery having excellent charge/discharge cycle characteristics and battery performance.

In the binder for a secondary battery according to an exemplary embodiment, (a+b):(c+d+e) of the copolymer may be at a mole fraction ratio of 0.05 to 0.95:0.95 to 0.05, or 0.2 to 0.9:0.8 to 0.1, or 0.3 to 0.85:0.7 to 0.15. The binder for a secondary battery including the copolymer satisfying the range shows further improved adhesive properties, and when a negative electrode and a secondary battery are manufactured using the binder, significantly improved charge/discharge cycle characteristics and battery performance may be implemented, wherein a, b, c, d, and e are mole fractions of the repeating units (a), (b), (c), (d), and (e), respectively, in the copolymer.

In the binder for a secondary battery according to an exemplary embodiment, a:b of the copolymer may be at a mole fraction ratio of 0.05 to 0.6:0.95 to 0.4, or 0.1 to 0.5:0.9 to 0.5, or 0.15 to 0.4:0.85 to 0.6; c:(d+e) of the copolymer may be at a mole fraction ratio of 0.05 to 0.5:0.95 to 0.5, or 0.05 to 0.45:0.95 to 0.55, or 0.1 to 0.4:0.9 to 0.6; and d:e may be at a mole fraction ratio of 0.1 to 0.99:0.9 to 0.01, or 0.5 to 0.99:0.5 to 0.01, or 0.7 to 0.95:0.3 to 0.05, but they are not limited thereto as long as the purpose of the present disclosure is achieved.

In the binder for a secondary battery according to an exemplary embodiment, e of the copolymer may be 0.001 or more, or 0.01 to 0.5, or 0.01 to 0.1, wherein e is a mole fraction of the repeating unit (e) in the copolymer. A binder for a secondary battery including the copolymer satisfying the range may show more improved adhesive properties.

In the binder for a secondary battery according to an exemplary embodiment, the copolymer may satisfy the following Equation 1, and specifically, may satisfy the following Equation 3:

$$0.45<(b+d+e)/(a+b+c+d+e)<1.0 \quad \text{[Equation 1]}$$

$$0.5<(b+d+e)/(a+b+c+d+e)<0.9 \quad \text{[Equation 3]}$$

wherein a, b, c, d, and e are mole fractions of the repeating units (a), (b), (c), (d), and (e), respectively, in the copolymer.

The binder for a secondary battery including the copolymer satisfying Equation 1, specifically Equation 3 has better tensile strength and adhesion, and also, when a negative electrode slurry composition for a secondary battery including the binder is prepared, the slurry composition has less or no agglomeration and has improved coatability, and the adhesion of the binder for a secondary battery is further improved, thereby effectively suppressing the exfoliation and the desorption of the negative electrode from a current collector. When a negative electrode and a secondary battery are manufactured using the binder for a secondary battery having adhesion as such, the expansion of a negative electrode is effectively suppressed to improve the charge/discharge cycle characteristics and the performance of a secondary battery, which is thus preferred, but the present disclosure is not limited thereto as long as the purpose of the present disclosure is achieved.

In the binder for a secondary battery according to an exemplary embodiment, the copolymer may satisfy the following Equation 2, specifically the following Equation 4:

$$0.01<e/(d+e)<0.9 \quad \text{[Equation 2]}$$

$$0.05<e/(d+e)<0.5 \quad \text{[Equation 4]}$$

wherein d and e are mole fractions of the repeating units (d) and (e), respectively, in the copolymer.

The binder for a secondary battery including the copolymer satisfying Equation 2, specifically Equation 4 may have better tensile strength and adhesion, and may effectively suppress the exfoliation and the desorption of the negative electrode from a current collector. In particular, since a secondary battery manufactured by using a binder composition for a secondary battery including the binder for a secondary battery including the copolymer satisfying Equation 2, specifically Equation 4; and a compound comprising an amine group and a hydroxyl group forms a robust three-dimensional structure by an ionic bond and/or a hydrogen bond, the expansion of a negative electrode is effectively suppressed so that a lower expansion rate and a more improved capacity retention rate are shown, thereby effectively improving the charge/discharge cycle characteristics and the performance of a secondary battery.

In addition, the binder for a secondary battery may further comprise one or more solvent(s) such as water and/or organic solvents as discussed below, and the solid content of the binder for a secondary battery may be 0.1 to 40 wt %, or 1 to 20 wt %, but the solvent may be used with appropriate adjustments depending on working conditions such as viscosity and coatability.

The secondary battery manufactured by using the binder for a secondary battery suppresses the expansion of a negative electrode so that a lower expansion rate and an improved capacity retention rate are shown, thereby effectively improving the charge/discharge cycle characteristics and the performance of the secondary battery.

The present disclosure provides a binder composition for a secondary battery, the binder composition comprising: a copolymer comprising a repeating unit (a) of Chemical Formula 1, a repeating unit (b) of Chemical Formula 2, a repeating unit (c) of Chemical Formula 3, a repeating unit (d) of Chemical Formula 4, and a repeating unit (e) of Chemical Formula 5; and a compound comprising an amine group and a hydroxyl group.

According to an exemplary embodiment, the copolymer is characterized by comprising all of the repeating units (a) to (e). A copolymer which does not comprise the repeating unit (a) and/or the repeating unit (c) has high stiffness and low strain(s), so that a copolymer chain may have an excessive linear shape. Thus, the copolymer comprises all of the repeating units (a) to (e) so as not to have an excessive linear shape, and a binder composition for a secondary battery comprising the copolymer; and a compound comprising an amine group and a hydroxyl group forms a robust three-dimensional structure by a more effective ionic bond and/or hydrogen bond, thereby showing a low expansion rate and an improved capacity retention rate to effectively improve the charge/discharge cycle characteristics and the performance of a secondary battery.

In addition, since the detailed description of the copolymer is the same as that of the copolymer of the binder for a secondary battery described above, it will be omitted.

In the binder composition for a secondary battery according to an exemplary embodiment, the copolymer may be included at 70 to 99.99 wt %, or 80 to 99.9 wt %, or 85 to 99.9 wt % with respect to the total weight of the binder composition for a secondary battery, but is not limited thereto.

In the binder composition for a secondary battery according to an exemplary embodiment, the compound comprising an amine group and a hydroxyl group may form an ionic bond and/or a hydrogen bond with the copolymer described above, thereby preparing a binder composition for a secondary battery having a three-dimensional structure. Specifically, the compound comprising an amine group and a hydroxyl group may be an aliphatic, alicyclic, or aromatic compound comprising one or more primary, secondary, or tertiary amine groups; and one or more hydroxyl groups. Without limitation, the compound comprising an amine group and a hydroxyl group may be represented by the following Chemical Formula 6:

$$OH—R_5—NH_2 \quad \text{[Chemical Formula 6]}$$

wherein $R_5$ is substituted or unsubstituted hydrocarbylene or heterohydrocarbylene having 1 to 10 carbon atoms, the hydrocarbylene or heterohydrocarbylene may be optionally substituted by one or more selected from —OH, —$NH_2$, —$R_6$OH, —$R_6NH_2$, and the like, and $R_6$ is hydrocarbylene or heterohydrocarbylene having 1 to 10 carbon atoms. In addition, the heterohydrocarbylene may include a secondary or tertiary amine group. In some non-limiting examples, in Chemical Formula 6, $R_5$ may be ethylene, propylene, or butylene, the ethylene, propylene, or butylene may be optionally substituted by one or more selected from —OH, —$NH_2$, —$R_6$OH, —$R_6NH_2$, and the like, and $R_6$ may be hydrocarbylene having 1 to 5 carbon atoms.

In the binder composition for a secondary battery according to an exemplary embodiment, the compound comprising an amine group and a hydroxyl group may be an aliphatic compound comprising 1 to 5 primary, secondary, or tertiary amine groups; and 1 to 10 hydroxyl groups, and in some non-limiting examples, may be an aliphatic compound comprising 1 to 3 primary or secondary amine groups; and 1 to 5 hydroxyl groups. In some non-limiting examples, the compound comprising an amine group and a hydroxyl group may have a weight average molecular weight of 10 to 1,000 g/mol, or 50 to 500 g/mol, but is not limited thereto.

In the binder composition for a secondary battery according to an exemplary embodiment, the compound comprising an amine group and a hydroxyl group may be one or a combination of two or more selected from the group consisting of monoethanol amine, diethanol amine, triethanolamine, N-methylethanolamine, 2-ethylaminoethanol, aminoethylethanolamine, 2-diethylaminoethanol, (2-aminoethoxy)-1-ethanol, 2-aminopropanol, 3-aminopropanol, 1,2-diaminopropanol, 1,3-diamino-2-propanol, 2-amino-2-methyl propanol, 2-amino-2-methyl butanol, 2-amino-2-ethyl-1,3-propanediol, 4-aminobutanol, 5-aminopentanol, tris(hydroxymethyl)aminomethane, or the like, but is not limited thereto as long as it is a compound comprising one or more amine groups and one or more hydroxyl groups.

In the binder composition for a secondary battery according to an exemplary embodiment, a mole ratio between the compound comprising an amine group and a hydroxyl group and the repeating unit (e) of Chemical Formula 5 included in the binder composition for a secondary battery may satisfy 0.01 to 1:1, or 0.1 to 1:1, or 0.5 to 1:1.

In the binder composition for a secondary battery according to an exemplary embodiment, the compound comprising an amine group and a hydroxyl group may be included at 0.01 to 30 parts by weight, or 0.1 to 15 parts by weight, or 1 to 10 parts by weight based on a dry weight, with respect to 100 parts by weight of the copolymer based on a dry weight. When the content range is satisfied, the expansion of a negative electrode is suppressed to show a lower expansion rate and an improved capacity retention rate, thereby effectively improving the charge/discharge cycle characteristics and the performance of the secondary battery.

The present disclosure may provide a negative electrode slurry composition for a secondary battery comprising the binder for a secondary battery described above or the binder composition for a secondary battery described above; and a negative electrode active material.

The negative electrode active material may be one or a combination of two or more selected from the group consisting of graphite-based active materials, platinum, palladium, a silicon-based active material, silver, aluminum, bismuth, tin, zinc, silicon-carbon composite materials, and the like. For example, it may be more preferred to use a silicon-based active material or a negative electrode active material comprising a silicon-based active material since better effects are shown, but it is preferred in terms of suppressing expansion, and it is not limited in terms of excellence in a binding force or electrical properties. In a preferred exemplary embodiment, the negative electrode active material may further comprise a graphite-based active material in the silicon-based active material, and a mass ratio between the silicon-based active material and the graphite-based active material may satisfy 3 to 97:97 to 3 or 10 to 90:90 to 10, but is not limited thereto.

The silicon-based active material may have an average particle diameter of 0.1 to 50 μm, but is not limited thereto, and the silicon-based active material may comprise a silicon-based material, for example, Si, $SiO_x$ ($0<x<2$), a Si-Q alloy (Q is one or a combination of two or more selected from the group consisting of alkali metals, alkaline earth metals, Group 13 element, Group 14 elements, Group 15 elements, Group 16 elements, transition metals, rare earth elements, and the like, except Si and C), silicon-carbon composites, and the like. The silicon-carbon composite may comprise, for example, silicon carbide (SiC) or silicon-carbon particles having a core-shell structure, and as a non-limiting example, may be formed by depositing a silicon layer on a graphite core surface. As another example, the silicon-carbon particles may be formed by coating commercially available graphite particles with a silicon layer by a chemical vapor deposition (CVD) process using a silicon precursor compound such as a silane-based compound. In some exemplary embodiments, the particles may further include amorphous carbon coating, but are not limited thereto.

The graphite-based active material may be artificial graphite or a mixture of artificial graphite and natural graphite. The graphite-based active material may have an average particle diameter (D50) of 5 to 30 μm, or 8 to 20 μm, and may be amorphous, plate-like, flaky, spherical, or fibrous, but is not limited thereto. Meanwhile, when the graphite-based active material is a mixture of artificial graphite and natural graphite, specifically, the content of the artificial graphite may be equivalent to or higher than the content of the natural graphite, and the artificial graphite and the natural graphite may be included at a weight ratio of 50 to 95:50 to 5, or 50 to 90:50 to 10, or 60 to 90:40 to 10. Thus, adhesive strength between a current collector and an active material layer may be further improved, and a high-rate charge capacity retention rate and charge/discharge cycle characteristics of a battery may be improved.

The negative electrode slurry composition for a secondary battery according to an exemplary embodiment may further comprise a conductive material and a solvent.

The conductive material is used for imparting conductivity to an electrode, and may be used without significant limitation as long as it is an electronically conductive material without causing a chemical change in a battery, and as the conductive material, one or a combination of two or more selected from the group consisting of graphite-based conductive materials, carbon black-based conductive materials, graphene, carbon nanotubes (CNT), metal and metal compound-based conductive materials, and the like may be used. A non-limiting example of the carbon black-based conductive material includes acetylene black, ketjen black, denka black, thermal black, channel black, and the like, the carbon nanotubes may have an average length of 1 to 20 μm, but is not limited thereto. A non-limiting example of the carbon nanotubes includes single-walled carbon nanotubes (SWCNT), double-walled carbon nanotubes (DWCNT), multi-walled carbon nanotubes (MWCNT), rope carbon nanotubes, and the like, and a non-limiting example of a metal-based or metal compound-based conductive material includes tin, tin oxide, tin phosphate ($SnPO_4$), titanium oxide, potassium titanate, perovskite materials such as $LaSrCoO_3$ and $LaSrMnO_3$, and the like, but the present disclosure is not limited to the listed conductive materials. The conductive material may be included at 0.05 to 30 wt % with respect to the total weight of the negative electrode active material layer, but the content of the conductive material may be appropriately adjusted depending on its application purpose and physical properties.

The solvent is a solvent for forming a negative electrode slurry composition for a secondary battery, and may be an aqueous solvent such as water. The solvent may be used at a content to allow the composition to have appropriate viscosity, considering the applicability and coatability of the negative electrode slurry composition for a secondary battery. Otherwise, an organic solvent or a mixed solvent of an organic solvent and water may be used as needed. When an organic solvent is used, a non-limiting example thereof may be one or more of alcohol, ether, ester, ketone, hydrocarbon, or the like, and is not limited thereto as long as the binder for a secondary battery described above is dissolved in the solvent.

The solid content (dry weight) of the negative electrode slurry composition for a secondary battery according to an exemplary embodiment may be 1 wt % or more, 5 wt % or more, 10 wt % or more, 20 wt % or more, 35 wt % or more, 40 wt % or more, 45 wt % or more, or 50 wt % or more, and though the upper limit is not limited, may be 60 wt % or less, 70 wt % or less, 80 wt % or less, or 95 wt % or less, or any values or subrange within these ranges, and is not limited thereto.

The present disclosure provides a negative electrode for a secondary battery comprising: a current collector; and a negative electrode active material layer disposed on the current collector, wherein the negative electrode active material layer comprises the binder for a secondary battery described above or the binder composition for a secondary battery described above, The current collector may be one or a combination of two or more selected from the group consisting of copper foil, nickel foil, stainless foil, titanium foil, nickel foam, copper foam, a polymer substrate coated with a conductive metal, and the like, but is not limited thereto, and materials known in the art may be used without limitation.

In the negative electrode for a secondary battery according to an exemplary embodiment, the binder for a secondary battery or the binder composition for a secondary battery may be included at 0.5 to 30 wt %, or 0.5 to 20 wt %, or 1 to 10 wt % with respect to the total weight of the negative electrode active material layer, but the amount of the binder or the composition is not particularly limited as long as the performance of a secondary battery to be desired in the present disclosure is not impaired. When the content of the binder satisfies the range, the expansion of a negative electrode and the desorption of a negative electrode occurring during charging and discharging may be effectively suppressed, thereby implementing further improved capacity and energy density of the secondary battery.

The negative electrode active material layer is subjected to a subsequent process such as drying of the negative electrode slurry composition for a secondary battery described above, thereby preparing a negative electrode active material layer comprising the binder for a secondary battery or the binder composition for a secondary battery; the negative electrode active material; the conductive material; and the like. Specifically, the negative electrode active material layer comprises the binder for a secondary battery or the binder composition for a secondary battery comprising the copolymer, thereby effectively suppressing the desorption of the negative electrode and the conductive material and the expansion of the negative electrode.

In addition, the negative electrode active material layer may have a thickness of 1 to 150 μm, or 10 to 100 μm, or 20 to 80 μm, but is not limited thereto. The thickness may be adjusted by coating an appropriate application amount depending on the solid content of the negative electrode slurry composition for a secondary battery described above, and specifically, the coating amount may be 0.1 to 20 $mg/cm^2$, or 1 to 10 $mg/cm^2$, but is not limited thereto.

The present disclosure may provide a secondary battery comprises: a positive electrode and a negative electrode for a secondary battery, wherein the negative electrode for a secondary battery comprises a current collector; and a negative electrode active material layer disposed on the current collector, and the negative electrode active material layer comprises the binder for a secondary battery described above or the binder composition for a secondary battery described above; and a negative electrode active material. Here, the detailed descriptions of the binder for a secondary battery, the binder composition for a secondary battery, the negative electrode active material, the negative electrode active material layer, the current collector, and the negative electrode for a secondary battery are as described above, and thus, will be omitted.

Specifically, the secondary battery may comprise the negative electrode for a secondary battery described above, a positive electrode, and an electrolyte, and may further comprise a separator interposed between the positive electrode and the negative electrode.

The positive electrode may comprise a current collector; and a positive electrode active material layer formed by applying a composition for a positive electrode comprising a positive electrode active material on the current collector. As the current collector, the negative electrode current collector described above may be used, and any material known in the art may be used, but is not limited thereto. In addition, the positive electrode active material layer may comprise a positive electrode active material, and optionally, may further comprise a binder for a positive electrode and a conductive material. The positive electrode active material may be any positive electrode active material known in the art, and may be, for example, a composite oxide of lithium with a metal selected from cobalt, manganese, nickel, and a combination thereof, but is not limited thereto. As the binder for a positive electrode and the conductive material, the negative electrode binder or the binder composition described above; and the negative electrode conductive material may be used, and any materials known in the art may be used, but the present disclosure is not limited thereto.

The electrolyte may be an electrolyte solution comprising an organic solvent and a lithium salt. The organic solvent serves as a medium in which ions involved in the electrochemical reaction of a battery may move, and for example, may be carbonate-based, ester-based, ether-based, ketone-based, alcohol-based, or aprotic solvents, the organic solvent may be used alone or in combination of two or more, and a mixing ratio when used in combination of two or more may be appropriately adjusted depending on battery performance to be desired. In addition, organic solvents known in the art may be used, but the present disclosure is not limited thereto.

The lithium salt is dissolved in the organic solvent and may act as a source of the lithium ion in the battery to allow basic operation of a lithium secondary battery and to promote movement of lithium ions between a positive electrode and a negative electrode. A non-limiting example of the lithium salt may include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)$ $(C_yF_{2y+1}SO_2)$ (x and y are natural numbers), LiCl, LiI, $LiB(C_2O_4)_2$, or a combination thereof, but is not limited thereto. The concentration of the lithium salt may be in a range of 0.1 M to 5.0 M, or 0.1 M to 2.0 M. When the concentration of the lithium salt satisfies the range, the electrolyte solution has appropriate conductivity and viscosity, thereby showing excellent electrolyte solution performance and effectively improving lithium ion mobility.

In addition, the electrolyte solution may further comprise pyridine, triethylphosphate, triethanolamine, cyclic ether, ethylene diamine, n-glyme, hexaphosphate triamide, a nitrobenzene derivative, sulfur, a quinone imine dye, N-substituted oxazolidinone, N,N-substituted imidazolidine, ethylene glycol, dialkyl ether, ammonium salt, pyrrole, 2-methoxyethanol, aluminum trichloride, and the like, for improving charge and discharge characteristics, flame retardant characteristics, and the like, if necessary. In some cases, a halogen-containing solvent such as carbon tetrachloride and ethylene trifluoride may be further included for imparting non-flammability, and fluoro-ethylene carbonate (FEC), propene sultone (PRS), fluoro-propylene carbonate (FPC), and the like may be further included for improving conservation properties at a high temperature.

The separator is a separator having micropores formed through which ions may pass, and a non-limiting example thereof may be one or a combination of two or more selected from the group consisting of glass fiber, polyester, polyethylene, polypropylene, polytetrafluoroethylene, and the like and may be in a non-woven fabric or woven fabric form. Specifically, a polyolefin-based polymer separator such as polyethylene and polypropylene may be mainly used in the lithium secondary battery, but the present disclosure is not limited thereto. In addition, a separator coated with a composition including a ceramic component or a polymer material may be used for securing thermal resistance or mechanical strength, the separator may be used optionally in a monolayer or multi-layer structure, and a separator known in the art may be used, but is not limited thereto.

The secondary battery according to an exemplary embodiment may have an expansion rate of 75% or less, or 60% or less, or 50% or less, or 45% or less, or 40% or less, and though the lower limit is not particularly limited, may be 0.1% or more. The secondary battery according to an exemplary embodiment satisfies the expansion rate range, thereby effectively preventing the separation and the desorption of a negative electrode by strong adhesive strength even with the volume change of an electrode occurring as charge and discharge progress, and improving the structural stability of an electrode to suppress an increase in resistance by volume expansion, and thus, significantly improved charge/discharge cycle characteristics and battery performance may be implemented.

The capacity retention rate after 50 cycles of charging and discharging of the secondary battery according to an exemplary embodiment may be 75% or more, or 80% or more or 90% or more. The secondary battery according to an exemplary embodiment may maintain a high capacity retention rate after charging and discharging, and may suppress the expansion of the negative electrode to effectively improve the charge/discharge cycle characteristics and the performance of a secondary battery.

The present disclosure provides a method of preparing a binder for a secondary battery comprising: (A) saponifying a copolymer comprising a repeating unit (a) of the following Chemical Formula 1 and a repeating unit (c) of the following Chemical Formula 3 (hereinafter, referred to as a first copolymer) to prepare a saponified copolymer; and (B) acidifying the saponified copolymer to prepare an acidified copolymer, wherein the saponified copolymer is a copolymer comprising: the repeating unit (a) of the following Chemical Formula 1, a repeating unit (b) of the following Chemical Formula 2, the repeating unit (c) of the following Chemical Formula 3, a repeating unit (d) of the following Chemical Formula 4, and a repeating unit (e) of the following Chemical Formula 5:

[Chemical Formula 1]

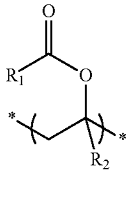

-continued

[Chemical Formula 2]

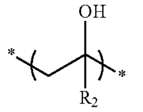

[Chemical Formula 3]

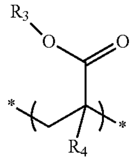

[Chemical Formula 4]

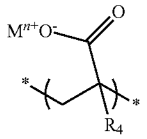

[Chemical Formula 5]

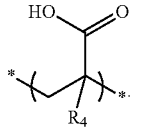

The detailed description of Chemical Formulae 1 to 5 is as described above, and thus, will be omitted.

In the method of preparing a binder for a secondary battery according to an exemplary embodiment, the first copolymer may be prepared from a polymerizable composition comprising vinyl acetate (to form repeating unit (a) of Chemical Formula 1) and alkyl (meth)acrylate (to form repeating unit (c) of Chemical Formula 3), and may be prepared by various known methods such as emulsion polymerization, suspension polymerization, solution polymerization, or bulk polymerization. Otherwise, as the first copolymer, commercially available products may be used without limitation.

A non-limiting example of the alkyl (meth)acrylate may be one or two or more selected from the group consisting of methyl acrylate, ethyl acrylate, propyl acrylate, isopropyl acrylate, n-butyl acrylate, isobutyl acrylate, methyl methacrylate, ethyl methacrylate, propyl methacrylate, isopropyl methacrylate, n-butyl methacrylate, isobutyl methacrylate, and the like.

In addition, the first copolymer may comprise known repeating units other than the repeating unit (a) and the repeating unit (c), but is not limited thereto.

In the method of preparing a binder for a secondary battery according to an exemplary embodiment, a:c of the first copolymer may be at a mole fraction ratio of 0.05 to 0.95:0.95 to 0.05, or 0.2 to 0.9:0.8 to 0.1, or 0.3 to 0.85:0.7 to 0.15, but is not limited thereto, wherein a and c are mole fractions of the repeating unit (a) and the repeating unit (c), respectively, in the first copolymer.

In the method of preparing a binder for a secondary battery according to an exemplary embodiment, the saponification reaction may be used without limitation as long as it is known or commonly used, and specifically, may be performed by dissolving or dispersing the first copolymer in water with alcohol or alcohol and using an alkali catalyst, and the alcohol may be methanol, ethanol, propanol, tert-butanol, and the like, without limitation, but specifically, may be methanol. The concentration of the copolymer in the alcohol may satisfy the range of 10 to 60 wt %, or 15 to 55 wt %, but is not limited, and the concentration may be appropriately adjusted depending on the viscosity. The alkali catalyst may be alkali metal hydroxides or alkali alkylates such as sodium hydroxide, potassium hydroxide, lithium hydroxide, sodium methylate, sodium ethylate, potassium methylate, and/or lithium methylate. The degree of saponification of the saponified copolymer may be adjusted depending on the amount of the catalyst added, and though a reaction temperature of the saponification reaction is not particularly limited, it may be 10 to 80° C., or 20 to 70° C.

In the method of preparing a binder for a secondary battery according to an exemplary embodiment, by saponifying the first copolymer, the repeating unit (a) of the first copolymer may form the repeating unit (b) and the repeating unit (c) of the first copolymer may form the repeating unit (d), and the saponified copolymer may include the repeating units (a) to (d).

In the method of preparing a binder for a secondary battery according to an exemplary embodiment, a degree of saponification may be calculated by (b+d+e)/(a+b+c+d+e), and the calculated value of the degree of saponification may satisfy Equation 1, and specifically, may satisfy Equation 3, wherein a, b, c, d, and e are mole fractions of the repeating units (a), (b), (c), (d), and (e), respectively, in the acidified copolymer. When the acidified copolymer satisfies Equation 1, specifically Equation 3, coatability, adhesive properties, and tensile strength may be further improved, and when a negative electrode slurry composition for a secondary battery is prepared by including the copolymer, the exfoliation and the desorption of the negative electrode from a current collector may be effectively suppressed. In addition, when a negative electrode slurry composition for a secondary battery and a negative electrode for a secondary battery are prepared using the acidified copolymer satisfying the range, a binding force between the negative electrode active material and the current collector is effectively improved to effectively suppress the expansion of a negative electrode, thereby improving the charge/discharge cycle characteristics and the performance of a secondary battery, but the numerical range of the degree of saponification is not limited thereto as long as the purpose of the present disclosure is achieved.

In addition, in step (A), the saponified copolymer may be a copolymer comprising the repeating unit (a) of Chemical Formula 1, the repeating unit (b) of Chemical Formula 2, the repeating unit (c) of Chemical Formula 3, and the repeating unit (d) of Chemical Formula 4, and the degree of saponification of the saponified copolymer may be calculated by (b+d)/(a+b+c+d). The degree of saponification may be more than 0.45 and less than 1, or more than 0.5 and less than 0.9, but is not limited thereto.

In the method of preparing a binder for a secondary battery according to an exemplary embodiment, the step (B) is a step of acidifying the saponified copolymer prepared in step (A) into an acidified copolymer by an acidification reaction, and the acidification reaction may be used without limitation as long as it is known or a commonly used method. For example, the acidification reaction may be performed by adding an acid aqueous solution comprising one or more acids selected from inorganic acids such as hydrochloric acid (hydrogen chloride), sulfuric acid, phosphoric acid, and nitric acid, organic acids such as formic acid, acetic acid, oxalic acid, and/or citric acid, and the like at a concentration of 0.1 to 20 N to a copolymer solution including 1 to 50 wt % of the saponified copolymer. The degree of acidification of the acidified copolymer may be adjusted depending on the amount of the acid aqueous solution added, and the amount added (ml) may be 0.01 to 15 ml/g, or 0.1 to 10 ml/g, with respect to the dry weight (g) of the copolymer solution based on a 1 N acid aqueous solution, but is not limited thereto. A reaction temperature may be 40 to 80° C., and a time to add the acid aqueous solution dropwise may be 10 minutes to 10 hours, or 1 to 3 hours. Subsequently, after the acid aqueous solution is added, stirring may be further performed for 1 to 15 hours, or 3 to 10 hours to perform the acidification reaction. After the reaction, an acidified copolymer may be obtained by solidification, filtration, and drying processes, according to a common or known method.

In the method of preparing a binder for a secondary battery according to an exemplary embodiment, by acidifying the saponified copolymer, the repeating unit (c) of the saponified copolymer may form the repeating unit (e), and the acidified copolymer may include the repeating units (a) to (e).

In the method of preparing a binder for a secondary battery according to an exemplary embodiment, the degree of acidification in step (B) may satisfy Equation 2, specifically Equation 4. The degree of acidification may be calculated by e/(d+e), and the detailed description is as described above, wherein d and e are mole fractions of the repeating units (d) and (e), respectively, in the acidified copolymer.

In the method of preparing a binder for a secondary battery according to an exemplary embodiment, the binder for a secondary battery according to an exemplary embodiment may be prepared by step (B), and the binder composition may be present in an aqueous solution state.

In the method of preparing a binder for a secondary battery according to an exemplary embodiment, after the process of (B), a step (C) of adding the acidified copolymer and a compound comprising an amine group and a hydroxyl group may be further comprised.

In the method of preparing a binder for a secondary battery according to an exemplary embodiment, in step (C), a method of adding the compound comprising an amine group and a hydroxyl group is not largely limited as long as it is a commonly used method or a known method, but for example, the binder composition may be prepared by dissolving the acidified copolymer in water to prepare an aqueous solution at a concentration of 5 to 50 wt %, adding the additive dropwise for 10 minutes to 3 hours, and performing stirring for 2 hours or more, and the compound may be used after diluting the compound in a solvent at a concentration of 1 to 90 wt %, or 5 to 50 wt %, but the present disclosure is not limited thereto.

In the method of preparing a binder for a secondary battery according to an exemplary embodiment, the binder composition for a secondary battery according to an exemplary embodiment may be prepared by step (C), and the binder composition may be present in an aqueous solution state. The binder composition may form a three-dimensional structure by a hydrogen bond and/or an ionic bond between the acidified copolymer and the compound comprising an amine group and a hydroxyl group, and may have a three-dimensional structure even in a solvent-free state after a drying step.

In the method of preparing a binder for a secondary battery according to an exemplary embodiment, the detailed description of the acidified copolymer and the example of the compound are as described for the copolymer of the binder for a secondary battery according to an exemplary embodiment above, and also, the specific description, the content, and the example of the compound comprising an amine group and a hydroxyl group are as described above, and thus, will be omitted.

Hereinafter, the present disclosure will be described in more detail with reference to the examples and the comparative examples. However, the following examples and the comparative examples are only an example for describing the present disclosure in more detail, and do not limit the present disclosure in any way.

The physical properties of the following examples and comparative examples were measured by the following methods.

[Method of Evaluating Physical Properties]

1. Weight Average Molecular Weight [kDa]

The weight average molecular weight of the copolymers prepared in the examples and the comparative examples were measured using GPC (Agilent). Agilent Mixed C (×2 ea) as a GPC column, tetrahydrofuran as a solvent, and polystyrene as a standard material were used, and the analysis was performed at a flow rate of 1 ml/min. at room temperature.

2. Tensile Strength [$Kgf/Cm^2$] and Yield Strain [%]

The tensile strength and the yield strain of the binder compositions prepared in the examples and the comparative examples were measured in accordance with ASTM D638. A specimen obtained by cutting a film having a thickness of 50 μm into type IV was prepared, the measurement was performed under the conditions of a speed of 3 mm/min., and the measured values are listed in Table 1.

3. Adhesion Test [N/20 mm]

The adhesion of the negative electrodes manufactured in the examples and the comparative examples were measured using UTM. The surface of a rolled negative electrode was adhered to a tape, the measurement was performed under the conditions of an angle of 180° and a speed of 30 mm/min., and the measured values are listed in Table 1.

4. Negative Electrode Slurry Composition Coatability

The negative electrode slurry compositions for a secondary battery prepared in the examples and the comparative examples were coated on a copper foil, and the coatability was evaluated based on the following criteria. The evaluation results are shown in the following Table 2.

- ⊚: coated in a uniform form throughout and no agglomerate observed
- ○: coated in a uniform form throughout
- (less than 5 agglomerates observed per unit area (100 mm×100 mm))
- Δ: some agglomerates observed
- (5 or more and less than 20 agglomerates observed per unit area (100 mm×100 mm))
- x: many agglomerates observed
- (20 or more agglomerates observed per unit area (100 mm×100 mm))

5. Evaluation of Battery Performance

A CR2016 coin type half cell was manufactured in the examples and the comparative examples and the electrochemical properties were evaluated.

1) Charge Capacity [mAh/g] and Discharge Capacity [mAh/g] at Cycle 1, and Initial (Charge and Discharge) Efficiency [%]

Secondary batteries manufactured in the examples and the comparative examples were charged and discharged once at 0.1 C between 0.01 V and 1.5 V, a charge capacity at cycle 1 (initial charge capacity)(mAh/g), a discharge capacity at cycle 1 (mAh/g), and initial (charge and discharge) efficiency (%) were measured, respectively, and the results are shown in the following Table 2.

2) Expansion Rate (%)

The thickness ($t_1$) of the secondary battery negative electrodes manufactured in the examples and the comparative examples was measured, a secondary battery was manufactured and charged to 0.01 V at 0.1 C-rate, and a half cell was disassembled to measure the thickness ($t_2$) of the negative electrode after charging. The expansion rate of the negative electrode was calculated by the following calculation formula, and the calculated expansion rate is shown in the following Table 2.

$$\text{Expansion rate (\%)}=(t_2-t_1)/(t_1-\text{current collector thickness})\times 100 \quad \text{[Calculation Formula]}$$

wherein a current collector thickness is the thickness of a negative electrode current collector used in the manufacture of the secondary battery negative electrode.

3) Capacity Retention Rate [%] after Charging and Discharging of 50 Cycles

The secondary batteries manufactured in the examples and the comparative examples were charged and discharged three times at 0.1 C between 0.01 V and 1.5 V, and 50 cycles of charging and discharging to 0.5 C between 0.01 V and 1.0 V were performed to evaluate the charge/discharge cycle characteristics of the batteries. During the charging, CV current conditions were 0.01 C CV cutoff. The charge/discharge cycle characteristics were obtained by measuring a capacity retention rate after 50 cycles of charging and discharging, specifically by showing a ratio (%) of a discharge capacity after repeating 50 cycles of charging and discharging to an initial discharge capacity. The results are shown in the following Table 2.

Example 1

Preparation of Copolymer and Binder Composition 90 g of water, 0.91 g of sodium dodecylbenzenesulfonate, and 0.13 g of sodium hydrogen carbonate were added to a round bottom flask under a nitrogen atmosphere, stirring was performed, an aqueous solution of 0.045 g of potassium persulfate dissolved in 2 g of water was added at 65° C., 33.5 g of vinyl acetate and 16.5 g of methyl acrylate were added right away thereto for 3 hours, and stirring was further performed at 65° C. for 2 hours to complete the polymerization reaction. 450 g of a saturated sodium chloride aqueous solution was added to the polymerization solution to agglomerate a copolymer, and filtration and drying were performed to obtain 42 g of a vinyl acetate/methyl acrylate copolymer. The obtained copolymer was dissolved in tetrahydrofuran, filtration was performed with a filter, and a weight average molecular weight determined by a molecular weight measurement device (GPC, RI detector) was 980 kDa.

30 g of the copolymer prepared above, 150 ml of methanol, and 9.0 g of sodium hydroxide were added to 150 ml of water and were completely dissolved therein, and stirring was performed at 60° C. for 12 hours to perform a saponification reaction. Next, the saponified solution was subjected to solidification in 1 L of ethanol, filtration, and drying steps, thereby finally obtaining 20 g of the saponified copolymer having a mole composition ratio of a vinyl acetate/vinyl alcohol/methyl acrylate/sodium acrylic acid copolymer of 16/51/6/27. The composition ratio was confirmed by $^{13}C$-NMR.

15 g of the saponified copolymer was added to 135 g of water, 6.1 ml of 1 N hydrogen chloride aqueous solution was added dropwise at 60° C. for 1 hour, stirring was further performed for 6 hours to perform an acidification reaction, the acidified solution was added to 0.5 L of ethanol, and precipitation, filtration, and drying steps were performed, thereby finally obtaining 12 g of an acidified copolymer having a mole composition ratio of vinyl acetate/vinyl alcohol/methyl acrylate/sodium acrylic acid/acrylic acid copolymer of 16/51/6/24/3.

10 g of the acidified copolymer was added to 90 g of water, and stirring was performed at 60° C. for 6 hours to dissolve the copolymer to obtain a binder composition. The tensile strength of the prepared binder composition was measured, and is listed in the following Table 1.

<Manufacture of Secondary Battery Negative Electrode>

A negative electrode active material, a CNT-based conductive material, and the binder composition prepared above were added to water so that a weight ratio of 95.75:0.25:4.0 was satisfied based on a dry weight, and were mixed, thereby preparing a negative electrode slurry composition for a secondary battery (solid content: 50 wt %). Specifically, the negative electrode active material was a mixture of 15 wt % of a silicon-based active material (SiC) having an average particle diameter of 6 μm and 85 wt % of graphite (artificial graphite having an average particle diameter (D50) of 13 μm), the CNT-based conductive material was a SW-CNT-based conductive material having an average length of 5 μm, and the negative electrode slurry composition satisfying the weight ratio was sufficiently stirred at a speed of 45 rpm for 30 minutes or more using a planetary mixer and dispersed. The thus-prepared negative electrode slurry composition was applied to a negative electrode Cu current collector (thickness: 10 μm) at an application amount of 5.6 $mg/cm^2$, dried in a vacuum oven at 70° C. for 10 hours, and rolled under the conditions of a temperature of 50° C. and a pressure of 15 MPa, thereby manufacturing a negative electrode having a final thickness of 50 μm. The adhesion of the negative electrode was measured and is listed in the following Table 1.

<Manufacture of Coin Cell (Secondary Battery)>

A polyethylene separator (thickness: 20 μm) was interposed between the negative electrode manufactured above and a lithium metal (thickness: 1 mm), and 1 M $LiPF_6$ dissolved in a mixed solvent including ethylene carbonate (EC)/fluoroethylene carbonate (FEC)/ethylmethyl carbonate (EMC)/diethyl carbonate (DEC) at a volume ratio of 20/10/20/50 was used as an electrolyte solution, thereby manufacturing a coin cell-type half battery (CR2016 coin half cell) according to a common manufacturing method. Battery performance was evaluated and is listed in the following Table 2.

Example 2

The process was performed in the same manner as in Example 1, except that 17.5 g of potassium hydroxide was used instead of sodium hydroxide in the saponification reaction, and 4.5 ml of a 1 N hydrogen chloride aqueous solution was used in the acidification reaction. The mole composition ratio of the synthesized vinyl acetate/vinyl alcohol/methyl acrylate/potassium acrylic acid/acrylic acid copolymer was 14/53/5/25/3. The measured physical properties are shown in the following Tables 1 and 2.

Example 3

The process was performed in the same manner as in Example 1, except that 12.2 ml of 1 N hydrogen chloride aqueous solution was used in the acidification reaction. The mole composition ratio of the synthesized vinyl acetate/vinyl alcohol/methyl acrylate/sodium acrylic acid/acrylic acid copolymer was 16/51/6/22/5. The measured physical properties are shown in the following Tables 1 and 2.

Example 4

The process was performed in the same manner as in Example 1, except that 38 g of vinyl acetate and 12.7 g of methyl acrylate were used in the copolymer synthesis, and 4.8 ml of 1 N hydrogen chloride aqueous solution was used in the acidification reaction. The weight average molecular weight of the synthesized vinyl acetate/methyl methacrylate copolymer was 870 kDa, and the mole composition ratio of the synthesized vinyl acetate/vinyl alcohol/methyl acrylate/sodium acrylic acid/acrylic acid copolymer was 16/60/4/18/2. The measured physical properties are shown in the following Tables 1 and 2.

Example 5

The process was performed in the same manner as in Example 1, except that 16.5 g of vinyl acetate and 33.5 g of methyl acrylate were used in the copolymer synthesis, and 10.3 ml of 1 N hydrogen chloride aqueous solution was used in the acidification reaction. The weight average molecular weight of the synthesized vinyl acetate/methyl methacrylate copolymer was 1100 kDa, and the mole composition ratio of the synthesized vinyl acetate/vinyl alcohol/methyl acrylate/sodium acrylic acid/acrylic acid copolymer was 7/26/15/47/5. The measured physical properties are shown in the following Tables 1 and 2.

Example 6

The binder composition of Example 6 was prepared by adding 0.27 ml of ethanolamine to 100 g of the binder composition prepared in Example 1 for 1 hour, and then performing stirring at room temperature for 4 hours. The subsequent process was performed in the same manner as in Example 1, and the measured physical properties are shown in the following Tables 1 and 2.

Example 7

The process was performed in the same manner as in Example 6, except that 0.34 ml of 3-aminopropanol was added instead of ethanolamine. The measured physical properties are shown in the following Tables 1 and 2.

Example 8

The process was performed in the same manner as in Example 6, except that 0.55 g of tris(hydroxymethyl)aminomethane was added instead of ethanolamine. The measured physical properties are shown in the following Tables 1 and 2.

Example 9

The binder composition of Example 9 was prepared by adding 0.92 ml of ethanolamine to 100 g of the binder composition prepared in Example 3 for 1 hour, and then performing stirring at room temperature for 4 hours. The subsequent process was performed in the same manner as in Example 3, and the measured physical properties are shown in the following Tables 1 and 2.

Example 10

The process was performed in the same manner as in Example 9, except that 0.46 ml of ethanolamine was added. The measured physical properties are shown in the following Tables 1 and 2.

Comparative Example 1

The process was performed in the same manner as in Example 6, except that polyvinyl alcohol (PVA, saponification degree: 80%) was used instead of the acidified copolymer. The measured physical properties are shown in the following Tables 1 and 2.

Comparative Example 2

The process was performed in the same manner as in Example 6, except that polyacrylic acid (PAA, Sigma Aldrich) was used instead of the acidified copolymer. The measured physical properties are shown in the following Tables 1 and 2.

Comparative Example 3

The process was performed in the same manner as in Example 1, except that a mixture of styrene-butadiene rubber (SBR, Sigma Aldrich) and carboxymethyl cellulose sodium salt (CMC, Sigma Aldrich) combined at a weight ratio of 1:1 was used instead of the binder composition in the manufacture of a secondary battery negative electrode. The measured physical properties are shown in the following Tables 1 and 2.

Comparative Example 4

The process was performed in the same manner as in Example 1, except that the acidification reaction step was not performed, and the binder composition was prepared using the saponified copolymer instead of the acidified copolymer. The measured physical properties are shown in the following Tables 1 and 2.

Comparative Example 5

The process was performed in the same manner as in Example 1, except that 14.6 g of sodium hydroxide was used in the saponification reaction to obtain a saponified copolymer having a mole composition ratio of a vinyl acetate/vinyl alcohol/methyl acrylate/sodium acrylic acid copolymer of 0/67/0/33, and the mole composition ratio of vinyl acetate/vinyl alcohol/methyl acrylate/sodium acrylic acid/acrylic acid of the prepared acidified copolymer was 0/67/0/30/3. The measured physical properties are shown in the following Tables 1 and 2.

Comparative Example 6

53.3 g of polyvinyl alcohol (saponification degree: 80%) and 320 g of distilled water were added to a 1 L reaction vessel, and stirring was performed at 100° C. to dissolve polyvinyl alcohol. Subsequently, 19.9 g of acrylic acid and 7.1 g of methyl acrylate were added at 60° C., stirring was performed, and 2.26 g of potassium peroxide as an initiator and 16.8 g of 1-butanethiol as a molecular weight adjusting agent were added thereto. After reaction for 4 hours under a nitrogen atmosphere, powder was obtained with washing with methanol, and finally, a vinyl acetate/vinyl alcohol/methyl acrylate/acrylic acid graft copolymer was obtained. The synthesized graft copolymer had a mole composition ratio of 15/59/6/20 and a weight average molecular weight of 360 kDa, and the measured physical properties are shown in the following Tables 1 and 2.

TABLE 1

| | Degree of saponification (b + d + e)/(a + b + c + d + e) | Degree of acidification e/(d + e) | Weight average molecular weight (Mw, kDa) | Tensile strength ($kgf/cm^2$) | Yield strain (%) | Adhesion (N/20 mm) |
|---|---|---|---|---|---|---|
| Example 1 | 0.78 | 0.1 | 980 | 1189 | 4.6 | 6.1 |
| Example 2 | 0.81 | 0.1 | 980 | 927 | 3.9 | 6.2 |
| Example 3 | 0.78 | 0.2 | 980 | 1101 | 4.1 | 6.0 |
| Example 4 | 0.80 | 0.1 | 870 | 981 | 4.5 | 5.8 |
| Example 5 | 0.78 | 0.1 | 1110 | 1214 | 3.6 | 5.5 |
| Example 6 | 0.78 | 0.1 | 980 | 1165 | 4.5 | 6.7 |
| Example 7 | 0.78 | 0.1 | 980 | 986 | 4.3 | 6.8 |
| Example 8 | 0.78 | 0.1 | 980 | 1082 | 3.8 | 6.0 |
| Example 9 | 0.78 | 0.2 | 980 | 1077 | 4.0 | 6.5 |
| Example 10 | 0.78 | 0.2 | 980 | 1022 | 3.7 | 6.5 |
| Comparative Example 1 | 0.80 | — | 205 | 780 | 5.8 | 2.3 |
| Comparative Example 2 | 1.0 | — | 176 | 1580 | 1.5 | 2.1 |
| Comparative Example 3 | — | — | — | 115 | 180 | 2.6 |
| Comparative Example 4 | 0.78 | — | 980 | 1100 | 3.2 | 3.5 |
| Comparative Example 5 | 1.0 | 0.1 | 980 | 1250 | 2.7 | 3.1 |
| Comparative Example 6 | 0.79 | 1.0 | 360 | 1100 | 2.9 | 3.3 |

In Table 1, it was confirmed that the binder for a secondary battery according to the examples had excellent tensile strength and adhesion, and when a negative electrode slurry composition comprising the binder was prepared, the composition had no agglomeration and excellent coatability.

TABLE 2

| | Slurry composition coatability | 1 cycle charge capacity (mAh/g) | 1 cycle discharge capacity (mAh/g) | Initial efficiency (%) | Expansion rate (%) | Capacity retention rate (%) after 50 cycles of charging and discharging |
|---|---|---|---|---|---|---|
| Example 1 | ⊚ | 630 | 580 | 92.1 | 45% | 89% |
| Example 2 | ○ | 628 | 579 | 92.2 | 49% | 86% |
| Example 3 | ○ | 627 | 581 | 92.7 | 53% | 82% |
| Example 4 | ○ | 633 | 583 | 92.1 | 51% | 83% |
| Example 5 | ○ | 628 | 580 | 92.4 | 56% | 82% |
| Example 6 | ⊚ | 631 | 584 | 92.6 | 37% | 95% |
| Example 7 | ⊚ | 633 | 585 | 92.4 | 39% | 93% |
| Example 8 | ○ | 625 | 578 | 92.5 | 47% | 88% |
| Example 9 | ○ | 630 | 583 | 92.5 | 45% | 90% |
| Example 10 | ○ | 628 | 581 | 92.5 | 46% | 89% |
| Comparative Example 1 | X | 624 | 568 | 91.0 | 89% | 65% |
| Comparative Example 2 | X | 613 | 560 | 91.4 | 88% | 60% |
| Comparative Example 3 | Δ | 631 | 584 | 92.6 | 78% | 64% |
| Comparative Example 4 | ○ | 627 | 579 | 92.3 | 61% | 78% |
| Comparative Example 5 | Δ | 634 | 584 | 92.1 | 60% | 65% |
| Comparative Example 6 | X | 627 | 579 | 92.4 | 61% | 67% |

In Table 2, it was confirmed that the binder for a secondary battery according to an exemplary embodiment improved a binding force between a negative electrode current collector and a negative electrode active material by excellent coatability and adhesion, and had a significantly low expansion rate and an effectively improved capacity retention rate after 50 cycles of charging and discharging, as compared with the comparative examples.

In addition, it was confirmed that in Example 1 using the copolymer comprising the repeating units derived from an acrylic acid by the acidification reaction, significantly excellent physical properties as compared with Comparative Example 4 were shown, and in particular, in Examples 6 and 7 in which the compound comprising an amine group and a hydroxyl group was added, more improved expansion rate and capacity retention rate after 50 cycles were shown, and a secondary battery manufactured by using the examples may implement more improved physical properties.

Thus, it was found that the binder for a secondary battery described above improves a binding force between the negative electrode current collector and the negative electrode active material, thereby obtaining an effect of suppressing the exfoliation and the desorption of the negative electrode, and thus, the expansion of the negative electrode is effectively suppressed to improve the charge/discharge cycle characteristics and the performance of a secondary battery.

The present disclosure provides a binder for a secondary battery comprising a copolymer comprising specific repeating units, and a binder composition for a secondary battery comprising the binder for a secondary battery; and a compound comprising an amine group and a hydroxyl group. When the binder for a secondary battery or the binder composition for a secondary battery is applied to a negative electrode and a secondary battery, the expansion of the negative electrode is effectively suppressed, and the charge/discharge cycle characteristics and the performance of the secondary battery are significantly improved. Furthermore, the binder for a secondary battery has improved coatability and adhesion to effectively suppress the exfoliation and the desorption of the negative electrode, thereby improving the performance of the secondary battery.

Hereinabove, although the present invention has been described by specific matters and limited exemplary embodiments, they have been provided only for assisting in the entire understanding of the present invention, and the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

The invention claimed is:

1. A secondary battery comprising: a positive electrode and a negative electrode for a secondary battery, wherein the negative electrode for a secondary battery comprises: a current collector; and a negative electrode active material layer disposed on the current collector, and the negative electrode active material layer comprises:

(i) a binder for a secondary battery comprising a copolymer, wherein the copolymer comprises a repeating unit (a) of the following Chemical Formula 1, a repeating unit (b) of the following Chemical Formula 2, a repeating unit (c) of the following Chemical Formula 3, a repeating unit (d) of the following Chemical Formula 4, and a repeating unit (e) of the following Chemical Formula 5, wherein the copolymer satisfies the following Equation 2, or (ii) a binder composition for a secondary battery comprising the copolymer and a compound comprising an amine group and a hydroxyl group, wherein the copolymer comprises the repeating unit (a) of the following Chemical Formula 1, the repeating unit (b) of the following Chemical Formula 2, the repeating unit (c) of the following Chemical Formula 3, the repeating unit (d) of the following Chemical Formula 4, and the repeating unit (e) of the following Chemical Formula 5, wherein the copolymer satisfies the following Equation 2:

[Chemical Formula 1]

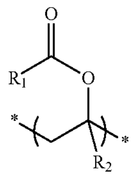

[Chemical Formula 2]

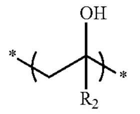

[Chemical Formula 3]

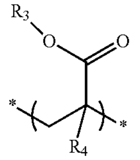

[Chemical Formula 4]

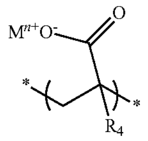

[Chemical Formula 5]

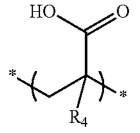

wherein $R_1$ and $R_3$ are independently of each other substituted or unsubstituted hydrocarbyl having 1 to 10 carbon atoms;

$R_2$ and $R_4$ are independently of each other hydrogen or substituted or unsubstituted hydrocarbyl having 1 to 10 carbon atoms;

$M^{n+}$ is a cation having an oxidation number of n other than a hydrogen ion; and n is an integer of 1 to 3, $$0.01 < e/(d+e) < 0.9 \quad \text{[Equation 2]}$$

wherein d and e are mole fractions of the repeating units (d) and (e), respectively, in the copolymer;

and a negative electrode active material.

2. The secondary battery of claim 1, wherein the negative electrode active material comprises a silicon-based active material.

3. The secondary battery of claim 2, wherein the negative electrode active material further comprises a graphite-based active material.

4. The secondary battery of claim 1, wherein the binder for a secondary battery or the binder composition for a secondary battery is comprised at 0.5 to 30 wt % with respect to a weight of the negative electrode active material layer.

5. A method of preparing a binder for a secondary battery, the method comprising:

(A) saponifying a copolymer comprising a repeating unit (a) of the following Chemical Formula 1 and a repeating unit (c) of the following Chemical Formula 3 to prepare a saponified copolymer; and (B) acidifying the saponified copolymer to prepare an acidified copolymer, wherein the acidified copolymer is a copolymer comprising: the repeating unit (a) of the following Chemical Formula 1, a repeating unit (b) of the following Chemical Formula 2, the repeating unit (c) of the following Chemical Formula 3, a repeating unit (d) of the following Chemical Formula 4, and a repeating unit (e) of the following Chemical Formula 5, wherein a degree of acidification in (B) is more than 0.01 and less than 0.9, and the degree of acidification is calculated by e/(d+e), wherein d and e are mole fractions of the repeating units (d) and (e), respectively, in the acidified copolymer:

[Chemical Formula 1]

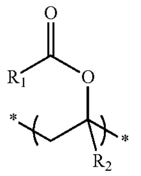

[Chemical Formula 2]

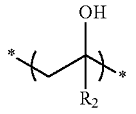

[Chemical Formula 3]

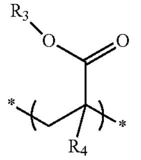

[Chemical Formula 4]

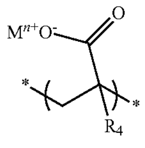

[Chemical Formula 5]

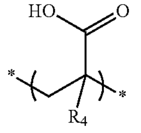

wherein $R_1$ and $R_3$ are independently of each other substituted or unsubstituted hydrocarbyl having 1 to 10 carbon atoms;

$R_2$ and $R_4$ are independently of each other hydrogen or substituted or unsubstituted hydrocarbyl having 1 to 10 carbon atoms;

$M^{n+}$ is a cation having an oxidation number of n other than a hydrogen ion; and n is an integer of 1 to 3.

6. The method of preparing a binder for a secondary battery of claim 5, wherein a degree of saponification is more than 0.45 and less than 1.0, and the degree of saponification is calculated by (b+d+e)/(a+b+c+d+e), wherein a, b, c, d, and e are mole fractions of the repeating units (a), (b), (c), (d), and (e), respectively, in the acidified copolymer.

7. The method of preparing a binder for a secondary battery of claim 5, wherein a degree of acidification in (B) is more than 0.05 and less than 0.5, and the degree of acidification is calculated by e/(d+e), wherein d and e are mole fractions of the repeating units (d) and (e), respectively, in the acidified copolymer.

8. The method of preparing a binder for a secondary battery of claim 5, further comprising: after (B), adding the acidified copolymer and a compound comprising an amine group and a hydroxyl group.

* * * * *